United States Patent
Sekiguchi

(10) Patent No.: US 6,928,541 B2
(45) Date of Patent: Aug. 9, 2005

(54) USER-AUTHENTICATION-TYPE NETWORK OPERATING SYSTEM BOOTING METHOD AND SYSTEM UTILIZING BIOS PREBOOT ENVIRONMENT

(76) Inventor: Yutaka Sekiguchi, c/o NEC Corporation, 7-1, Shiba 5-chome, Minato-ku, Tokyo (JP)

(*) Notice: Subject to any disclaimer, the term of this patent is extended or adjusted under 35 U.S.C. 154(b) by 679 days.

(21) Appl. No.: 09/878,351

(22) Filed: Jun. 12, 2001

(65) Prior Publication Data

US 2001/0052069 A1 Dec. 13, 2001

(30) Foreign Application Priority Data

Jun. 13, 2000 (JP) .................................... 2000-177043

(51) Int. Cl.[7] .......................................... G06F 15/177
(52) U.S. Cl. .............................................. 713/2; 713/1
(58) Field of Search ............................... 713/1, 2, 100

(56) References Cited

U.S. PATENT DOCUMENTS

| | | | | |
|---|---|---|---|---|
| 5,577,210 | A | * 11/1996 | Abdous et al. | ............. 709/219 |
| 6,324,644 | B1 | * 11/2001 | Rakavy et al. | ................. 713/1 |
| 6,463,530 | B1 | * 10/2002 | Sposato | ........................ 713/2 |
| 6,711,688 | B1 | * 3/2004 | Hubacher et al. | ........... 713/201 |
| 6,718,462 | B1 | * 4/2004 | Griffiths et al. | ................ 713/2 |

FOREIGN PATENT DOCUMENTS

| | | |
|---|---|---|
| JP | 6-332716 | 2/1994 |
| JP | 7-319709 | 12/1995 |
| JP | 10-511783 | 11/1998 |
| JP | 11-53176 | 2/1999 |

OTHER PUBLICATIONS

Japanese Office Action dated Oct. 26, 2004 with English translation of pertinent portions.
Article tiled "NC Network Computer" ppg. 1–4.

* cited by examiner

Primary Examiner—Dennis M. Butler

(57) ABSTRACT

Disclosed is a system that make it possible for a user to readily boot an operating system from a user terminal with user-specific settings, thereby making it unnecessary for the server to register an image for each OS environment, as a result of which the required storage capacity of the server can be reduced. The user terminal, which is connected to the server by a network, is booted using an operating system stored in the server. In booting of the user terminal, user information that has been selected by the user from OS-booting user information stored on a removable storage medium of the user terminal is transmitted to the server under the control of a BIOS preboot environment stored in a storage device of the user terminal. On the basis of the user information, the server authenticates the user terminal, transmits the operating system to the user terminal and network-boots the operating system in a user-specific environment.

5 Claims, 3 Drawing Sheets

FIG. 2

REMOVABLE STORAGE MEDIUM 7

USER INFORMATION
USER ID: USER 1

SETTINGS NAME: SETTINGS 1
BOOT OS: OS 1
START-UP APP: APP 1
SECURITY: S1
BOOT OPTION

SETTINGS NAME: SETTINGS 2
BOOT OS: OS 2
START-UP APP: APP 2, APP3
SECURITY: S2
BOOT OPTION

. . .

SETTINGS NAME: SETTINGS N
BOOT OS: OS 1
START-UP APP: APP 1, APP4
SECURITY: S3
BOOT OPTION

USER-AUTHENTICATION-TYPE NETWORK OPERATING SYSTEM BOOTING METHOD AND SYSTEM UTILIZING BIOS PREBOOT ENVIRONMENT

FIELD OF THE INVENTION

This invention relates to a network-connected information system and, more particularly, to a technique for the network booting of an operating system.

BACKGROUND OF THE INVENTION

When a terminal loads and boots an operating system (OS) from a server or the like to which the terminal is connected, the usual practice is to use a preboot environment (a boot setting environment) that has been stored in an option ROM (read-only memory) on the NIC (Network Interface Card) of the terminal, for example, and download a boot image that has been registered with the server to the terminal as a binary image, whereby start-up is achieved.

The specification of Japanese Patent Kokai publication JP-A-7-319709 discloses an information processing system equipped with a recording/reproducing apparatus for recording information on and reproducing information from a removable storage medium having a writable area and a read-only area on which boot information, operating-system information, program information that is run on the basis of the operating system and management information has been stored, wherein a central processing unit causes the recording/reproducing apparatus to reproduce the operating-system information from the recording medium and store this information in memory. Further, the specification of Japanese Patent Kokai Publication JP-A-10-511783 discloses an arrangement which, before the operating system of a work station is fully loaded, transfers controls from boot preprocessing of the work station to external processing, starts up the network connection of the work station to the network server, updates the files in the work station based upon data that has been placed in the server, and loads and executes various elements of the work station and network operating system during the work station booting sequence.

SUMMARY OF THE DISCLOSURE

However, the prior-art methods involve a number of problems.

A first problem is that when a plurality of network-connected terminals are operated in different OS environments, it is required that a different boot image be created for each different OS environment and that the images be registered with the server. It is difficult, therefore, to implement a different OS environment for every user.

The reason for the foregoing is that when an attempt is made to implement an OS environment used by each individual user, an image must be created and registered with the server on a per-user basis. As a result, the volume of the boot images of the operating systems to be registered with the server increases in proportion to the number of users. This places pressure upon the server in terms of storage capacity.

Further, in a case where a boot menu is displayed at the terminal and a selection is made from the menu, it is difficult for the user to select the sought environment from all environments of all registered users.

A second problem is that it is difficult to enhance security. The reason for this is that effective security information other than a password that the user enters from the terminal is not available.

If an attempt is made to enhance security by having the user set a more complicated password, the user must perform a troublesome input operation whenever the OS is booted. This is not a practical solution.

Accordingly, an object of the present invention is to provide a system, method and recording medium that make it possible for a user to readily boot an operating system from a terminal with a user-specific settings.

Another object of the present invention is to provide a system, method and recording medium that make it unnecessary to register an image with a server for every OS environment.

A further object of the present invention is to provide a system, method and recording medium that enhance security.

According to an aspect of the present invention, there is provided a method of booting a user terminal, which is connected to a server by a network, using an operating system stored in the server, wherein when booting is performed, preboot means of the user terminal transmits OS-booting user information, which has been recorded on a storage medium accessed by the user terminal, to the server, and the server authenticates the user of the terminal based upon the user information and causes network booting of the operating system in an environment that is specific to the user.

Specifically, in the method in booting of the user terminal, user information that has been selected by a user from OS-boot setting user information stored on a storage medium that is accessed by the user terminal is transmitted to a server under the control of preboot means started up at the user terminal; and on the basis of the user information transmitted from the user terminal, the server authenticates the user terminal, transmit a specified operating system and application to the user terminal, and boot the user terminal in a user-specific environment.

Preferably, the OS-boot setting user information has been stored on a removable storage medium accessed by the user terminal.

According to a second aspect, there is provided a network operating system booting method, comprising:

(a) a step, performed by a user terminal when power is supplied to the user terminal, of executing a system BIOS that has been stored on a read-only storage device, executing predetermined initialization processing by the system BIOS, subsequently loading BIOS preboot means, which has been stored in the storage device, into a memory of the user terminal and delivering control to the BIOS preboot means;

(b) a step, performed by the BIOS preboot means, of acquiring OS booting user information, which has been stored on a removable storage medium, using a removable-storage device driver of the user terminal, and displaying this user information as a boot menu on a display of the user terminal;

(c) a step, performed by the BIOS preboot means when the user selects an OS environment from the boot menu displayed on the display, of transmitting user information to a server via a network, the user information corresponding to the OS environment selected by the user and including an operating system, start-up application, user ID and security information;

(d) a step, performed by the server that has received the user information transmitted from the user terminal, of retrieving the user information from a user database on which user information has been registered in advance, comparing the user information that has been transmitted from the user terminal with information that has been registered in the user database, and transmitting a specified operating system and application to the user terminal if it is verified that the user possesses the privilege to implement a requested OS environment; and (e) a step, performed by the BIOS preboot means of the user terminal, of storing the operating system and application, which have been transmitted from the server, as files in a secondary storage device of the user terminal, delivering control to the operating system together with an OS boot option, and booting the operating system.

According to third aspect, there is provided a network operating system booting system having a user terminal and a server connected to the user terminal and storing an operating system executed by the user terminal, wherein preboot means is started up in the user terminal at booting thereof;

the preboot means having means for transmitting, to the server, information corresponding to an operating system selected by a user from OS-boot setting user information stored on a storage medium that is accessed by the user terminal;

the server having means for authenticating the user of the user terminal based upon the user information that has been transmitted from the user terminal, and transmitting a specified operating system and application to the user terminal.

According to a fourth aspect, there is provided, in a user terminal, a network operating system booting system for executing a system BIOS in a read-only storage device when power is supplied to the user terminal;

the system BIOS performing control to load BIOS preboot means, which has been stored in the storage device, into a memory of the user terminal after initialization processing is executed, and deliver control to the BIOS preboot means;

the BIOS preboot means having means for acquiring OS booting user information, which has been stored on a removable storage medium, using a removable-storage device driver of the user terminal;

means for extracting settings names from all settings information included in the user information and displaying these settings names as a boot file on a display of the user terminal; and means which, when the user selects an OS environment desired to be booted from the boot menu displayed on the display, is for transmitting an operating system, start-up application, user ID and security information, which correspond to the OS environment selected from the user information by the user, to a server;

the server having:

a user database in which user information has been registered;

means which, when the operating system, start-up application, user ID and security information have been received from the user terminal, is for retrieving information of the user ID from the user database, comparing the user information that has been transmitted from the user terminal with information that has been registered in the user database, and verifying whether the user possesses the privilege to implement a requested OS environment; and means for transmitting an operating system and application, which have been specified at the user terminal, to the user terminal if it has been verified that the user possesses the privilege;

the BIOS preboot means of the user terminal having:

means for storing the operating system and application, which have been transmitted from the server, as files in a secondary storage device of the user terminal; and means for delivering control to the operating system together with a boot option of the operating system, and booting the operating system.

Preferably, the user information includes a user ID and settings information, and the settings information includes a settings name, bootable operating system, application, security information and boot option, which is delivered to the operating system, displayed on a display of the user terminal.

According to a fifth aspect, there is provided a computer readable program product for executing the following processes (a) to (f):

wherein when power is supplied to a user terminal, a system BIOS in a read-only storage device thereof is executed;

the system BIOS having:

(a) a process for performing control to load BIOS preboot means, which has been stored in the storage device, into a memory of the user terminal after initialization processing is executed, and delivering control to the BIOS preboot means;

the BIOS preboot means having:

(b) a process for acquiring OS booting user information, which has been stored on a removable storage medium, using a removable-storage device driver of the user terminal;

(c) a process for extracting settings names from all settings information included in the user information and displaying these settings names as a boot file on a display of the user terminal; and (d) a process which, when the user selects an OS environment desired to be booted from the boot menu displayed on the display, is for transmitting an operating system, start-up application, user ID and security information, which correspond to the OS environment selected from the user information by the user, to a server;

the server having a user database in which user information has been registered; when the user information has been received, the server retrieving the user information from the user database, comparing the user information that has been transmitted from the user terminal with information that has been registered in the user database; the server verifying whether the user possesses the privilege to implement a requested OS environment; and the server transmitting an operating system and application, which have been specified at the user terminal, to the user terminal if it has been verified that the user possesses the privilege;

the BIOS preboot means of the user terminal having:

(e) a process for storing the operating system and application, which have been transmitted from the server, as files in a secondary storage device of the user terminal; and (f) a process for delivering control to the operating system together with a boot option of the operating system, and booting the operating system.

According to a sixth aspect, there is provided a computer readable program product for executing processes (a) and (b) by a computer of a server, wherein when power is supplied to a user terminal, a system BIOS in a read-only storage device thereof is executed;

the system BIOS having means for loading BIOS preboot means, which has been stored in the storage device, in a memory of the user terminal after initialization processing, and delivering control to the BIOS preboot means;

the BIOS preboot means having:

means for acquiring OS booting user information, which has been stored on a removable storage medium, using a removable-storage device driver of the user terminal;

means for extracting settings names from all settings information included in the user information and displaying these settings names as a boot file on a display of the user terminal; and means which, when the user selects an OS environment desired to be booted from the boot menu displayed on the display, is for transmitting an operating system, start-up application, user ID and security information, which correspond to the OS environment selected from the user information by the user, to a server;

the server having a user database in which user information has been registered;

the server having:

(a) a process which, when the user information has been received, retrieves the user information from the user database, compares the user information that has been transmitted from the user terminal with information that has been registered in the user database, and verifies whether the user possesses the privilege to implement a requested OS environment; and (b) a process for transmitting an operating system and application, which have been specified at the user terminal, to the user terminal if it has been verified that the user possesses the privilege;

the BIOS preboot means of the user terminal having:

means for storing the operating system and application, which have been transmitted from the server, as files in a secondary storage device of the user terminal; and means for delivering control to the operating system together with a boot option of the operating system, and booting the operating system.

According to a seventh aspect, there is provided a user terminal network-connected to a server which stores an operating system executed by the user terminal, the user terminal downloading the operating system from the server and booting the operating system, the user terminal comprising:

preboot means started up at booting; and means for accessing a storage medium removably inserted into the user terminal;

the preboot means having:

means for transmitting, to the server, information corresponding to an operating system which a user has selected from OS-boot setting user information that has been recorded on the storage medium; and means which, when the server authenticates the user of the user terminal based upon the user information that has been transmitted from the user terminal and transmits a specified operating system and application to the user terminal, is for storing the operating system and application as files in a secondary storage device of the user terminal, delivering control to the operating system together with a boot option of the set operating system, and booting the operating system.

According to an eighth aspect, there is provided a server comprising a storage device for storing an operating system and an application started up by a user terminal a user database in which are previously registered, for every user ID, an operating system bootable by the user terminal, an application capable of being started by the user terminal, and security information;

means which, when the user information has been received by the user terminal set forth in claim 10, is for retrieving the user information from the user database, comparing the user information that has been transmitted from the user terminal with information that has been registered in the user database, and verifying whether the user possesses the privilege to implement a requested OS environment; and means for transmitting an operating system and application, which have been specified at the user terminal, to the user terminal if it has been verified that the user possesses the privilege.

BRIEF DESCRIPTION OF THE DRAWINGS

FIG. 2 is a diagram showing an example of user information on a removable storage medium in this embodiment of the invention.

PREFERRED EMBODIMENTS OF THE INVENTION

Figure 1:
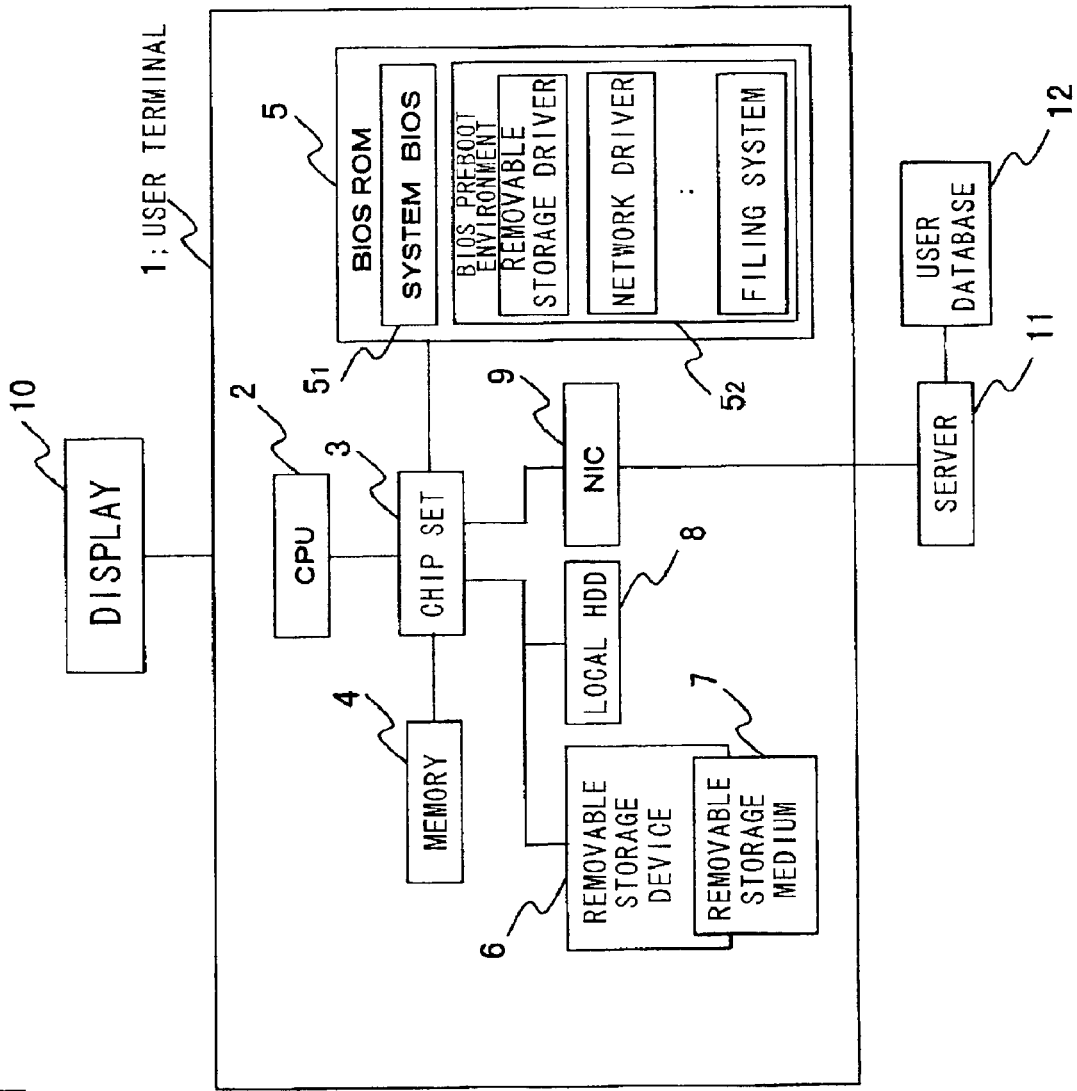
FIG. 1 is a block diagram illustrating a preferred embodiment of the present invention.

In a preferred mode for practicing the invention, control at boot-up of a user terminal is transferred to a BIOS preboot environment that has been stored in a BIOS storage device for storing a BIOS, and the BIOS preboot environment displays OS-boot selection user information, which has been stored on a storage medium (preferably a removable recording medium) accessed by the user terminal, as a boot menu on a display of the user terminal, and transmits information, which has been selected by the user, to the server, and the server, upon receiving this information, causes network booting of the user terminal in a user-specific environment using the operating system selected by the user.

In a preferred mode for practicing the invention, the user terminal has preboot means (a BIOS preboot environment) that is started up at booting, and means for accessing a storage medium removable loaded in the user terminal, wherein the preboot means has means for transmitting, to the server, information corresponding to an operating system selected by the user from OS-boot setting user information that has been recorded on the storage medium, and means which, when the server authenticates the user of the terminal based upon the user information transmitted from the user terminal and transmits a specific operating system and application to the user terminal, is for storing the operating system and the application as files in a secondary storage device of the user terminal, delivering control to the operating system together with a boot option of the operating system, and starting up the operating system.

In a preferred mode for practicing the invention, the server has a storage device for storing an operating system and an application started up at the user terminal; a user database for registering, in advance for ever user ID, an operating system and application that can be started up by the user terminal as well as securing information; means which, when user information has been received from the user terminal, is for searching the user database for the user, comparing the user information sent from the user terminal with information that has been registered in the user database, and verifying that the user has the privilege to implement a requested operating system; and means which, if verification has been performed correctly, is for transmitting an operating system and application, which have been specified at the user terminal, to the user terminal.

In a preferred mode for practicing the present invention, user information that the BIOS preboot environment displays on the display is stored in the user terminal, preferably on a removable storage medium. This will make it possible for the user to implement a user-specific OS environment with relying upon a specific terminal.

Other features and advantages of the present invention will be apparent from the following description taken in conjunction with the accompanying drawings, in which like reference characters designate the same or similar parts throughout the figures thereof.

A preferred embodiment of the present invention will now be described with reference to the drawings.

FIG. 1 is a block diagram illustrating a preferred embodiment of the present invention.

As shown in FIG. 1, a user terminal 1 includes a CPU (Central Processing Unit) 2, a chip set 3, a memory 4, a BIOS ROM (a read-only memory of a basic input/output system) 5, a removable storage device 6, a removable storage medium 7, a local hard-disk drive (HDD) 8 connected to the terminal and serving as a secondary storage device, and an NIC (Network Interface Card) 9 for server communication. A display 10 is connected to the user terminal 1. The user terminal 1 is connected via a network to a server 11 in which operating systems have been stored. The server 11 is connected to a user database 12 storing information relating to a plurality of users.

A system BIOS 5-1 and a BIOS preboot environment 5-2 has been stored in the BIOS ROM 5. Various drivers such as a removable-storage driver for the BIOS preboot environment, a local-HDD driver and a network driver, and a filing system for the removable-storage medium and local HDD have been stored in the BIOS preboot environment 5-2.

Some of the drivers inclusive of the removable-storage driver and local-HDD driver and the filing system can be accessed randomly from the operating system.

FIG. 2 is a diagram showing an example of user information on the removable storage medium 7 in this embodiment of the invention. User information has been stored on the removable storage medium 7 in a manner shown in FIG. 2. The user information includes one user ID and multiple items of setting information.

Each item of setting information consists of a setting name displayed on the display, the operating system to be booted, the applications (APP) to be launched, security information and a boot option delivered to the operating system.

Information concerning multiple users has been stored in the user database 12. By comparing this information with user information transmitted from the terminal, whether a request is an unauthorized request is determined.

The operation of this embodiment will now be described.

When the power supply of the user terminal 1 is turned on, the user terminal 1 implements the system BIOS 5-1 in the BIOS ROM 5. When platform initialization ends, the system BIOS 5-1 loads the BIOS preboot environment 5-2, which has been stored in the BIOS ROM 5, into the memory 4 and delivers control to this environment.

The BIOS preboot environment 5-2 uses the removable-storage driver to acquire OS-booting user information that has been stored on the removable storage medium 7.

The BIOS preboot environment 5-2 extracts the setting names from all settings included in the user information and displays the names as a boot menu on the display 10 of the user terminal.

The OS environment signifies the operating system and application (APP) started up and the user environment set by the user with respect to the operating system.

Since the user environment is delivered to the operating system as a boot option, it is possible to set, even with regard to a single operating system, a plurality of OS environments for every process desired to be executed in the operating system.

When the OS environment desired to be booted up is selected by the user from the boot menu displayed on the display 10, the BIOS preboot environment 5-2 transfers the operating system, the start-up application, user ID and security information corresponding to the OS environment that the user selected from the user information to the server 11.

Figure 3:
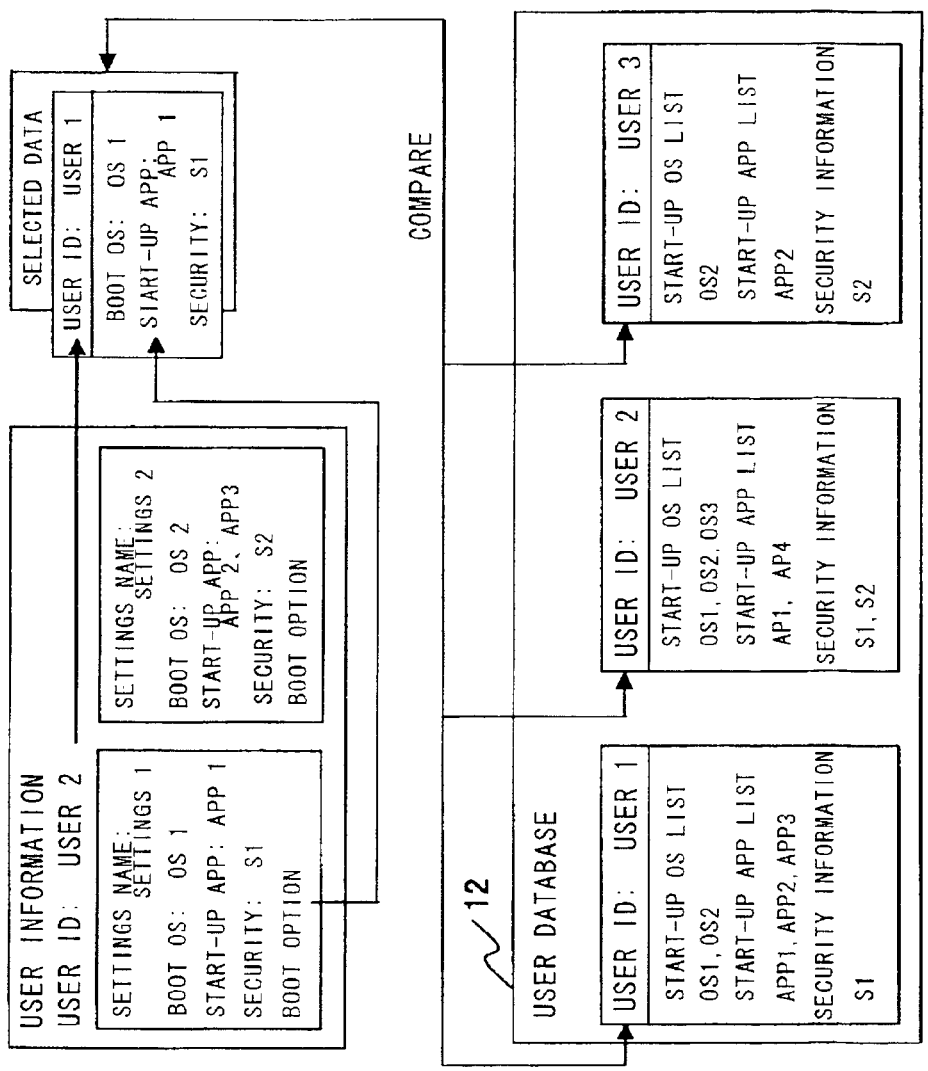
FIG. 3 is a schematic view useful in describing the manner in which a server compares user information, which has been transmitted from a user terminal, with registered information in a user database.

FIG. 3 is a schematic view useful in describing the manner in which the server 11 compares user information, which has been transmitted from the user terminal 1, with registered information in the user database 12. As shown in FIG. 3, the server 11, which has received user information from the user terminal 1, retrieves the user information from the user database 12 in which the user information has been registered in advance, compares the user information (user ID: user 1) selected at the user terminal 1 with information (the list of bootable operating systems and list of applications that can be launched) and security information of the same user ID registered in the user database 12, verifies that the user possesses the privilege to implement the requested operating system and then transmits the specified operating system and application to the user terminal 1.

In the example shown in FIG. 3, the user information that has been transmitted from the user terminal 1 (i.e., user ID: user 1, boot OS: OS 1, start-up application: APP 1, security information: S1) is compared with the bootable operating systems (OS 1, OS 2), applications (APP 1, APP 2, APP 3) capable of being started up and security information (S1) of user information that has been registered in the user database 12, and therefore OS 1, APP 1 are transmitted to the user terminal 1.

The BIOS preboot environment stores the operating system and application (APP), which have been transmitted from the server 11, as files in the local HDD 8, delivers control to the operating system together with the OS boot option and boots the operating system.

The control software (firmware) of the system BIOS and BIOS preboot environment stored in the BIOS ROM 5 of the user terminal is implemented by program. Further, the processing for authentication based upon the comparison between the user information that has been registered in the user database 12 of server 11 and the user information that has been selected at the user terminal 1 is implemented by a program executed by the server 11. In the present invention, these programs, which has been recorded on a recording medium, are loaded from the medium to the memory of the computer and the functions thereof are implemented by the computer.

The meritorious effects of the present invention are summarized as follows.

A first advantage of the present invention is that a user can readily boot an operating system from a terminal with user-specific settings.

The reason for this is that information necessary to construct the OS environment is stored on removable storage media that the user is capable of carrying about.

A second advantage of the present invention is that an OS image for every OS environment is registered with a server.

The reason for this is that since operating systems and applications are stored as files by using a BIOS preboot environment, it is possible to register the operating systems and applications as individual images.

A third advantage of the present invention is that security can be enhanced.

The reason for this is that in the present invention, user information is stored in both the server and removable storage medium and security is assured by comparing the items of information. As a result, combining this security technique with a conventional security technique that relies upon a password can enhance security.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A network operating system booting method, comprising:

(a) a step, performed by a user terminal when power is supplied to said user terminal, of executing a system BIOS that has been stored on a read-only storage device, executing predetermined initialization processing by the system BIOS, subsequently loading BIOS preboot means, which has been stored in said storage device, into a memory of said user terminal and delivering control to said BIOS preboot means;

(b) a step, performed by said BIOS preboot means, of acquiring OS booting user information, which has been stored on a removable storage medium, using a removable-storage device driver of said user terminal, and displaying this user information as a boot menu on a display of said user terminal;

(c) a step, performed by said BIOS preboot means when the user selects an OS environment from the boot menu displayed on said display, of transmitting user information to a server via a network, said user information corresponding to the OS environment selected by the user and including an operating system, start-up application, user ID and security information;

(d) a step, performed by said server that has received the user information transmitted from said user terminal, of retrieving the user information from a user database on which user information has been registered in advance, comparing the user information that has been transmitted from said user terminal with information that has been registered in said user database, and transmitting a specified operating system and application to said user terminal if it is verified that the user possesses the privilege to implement a requested OS environment; and (e) a step, performed by said BIOS preboot means of said user terminal, of storing the operating system and application, which have been transmitted from said server, as files in a secondary storage device of said user terminal, delivering control to said operating system together with an OS boot option, and booting said operating system.

2. In a user terminal, a network operating system booting system for executing a system BIOS in a read-only storage device when power is supplied to said user terminal;

said system BIOS performing control to load BIOS preboot means, which has been stored in said storage device, into a memory of said user terminal after initialization processing is executed, and deliver control to said BIOS preboot means;

said BIOS preboot means having means for acquiring OS booting user information, which has been stored on a removable storage medium, using a removable-storage device driver of said user terminal;

means for extracting settings names from all settings information included in the user information and displaying these settings names as a boot file on a display of said user terminal; and means which, when the user selects an OS environment desired to be booted from the boot menu displayed on said display, is for transmitting an operating system, start-up application, user ID and security information, which correspond to the OS environment selected from the user information by the user, to a server;

said server having:

a user database in which user information has been registered;

means which, when the operating system, start-up application, user ID and security information have been received from said user terminal, is for retrieving information of the user ID from said user database, comparing the user information that has been transmitted from said user terminal with information that has been registered in said user database, and verifying whether the user possesses the privilege to implement a requested OS environment; and means for transmitting an operating system and application, which have been specified at said user terminal, to said user terminal if it has been verified that the user possesses said privilege;

said BIOS preboot means of said user terminal having:

means for storing the operating system and application, which have been transmitted from said server, as files in a secondary storage device of said user terminal; and means for delivering control to said operating system together with a boot option of said operating system, and booting said operating system.

3. A computer readable program product for executing the following processes (a) to (f):

wherein when power is supplied to a user terminal, a system BIOS in a read-only storage device thereof is executed;

said system BIOS having:

(a) a process for performing control to load BIOS preboot means, which has been stored in said storage device, into a memory of said user terminal after initialization processing is executed, and delivering control to said BIOS preboot means;

said BIOS preboot means having:

(b) a process for acquiring OS booting user information, which has been stored on a removable storage medium, using a removable-storage device driver of said user terminal;

(c) a process for extracting settings names from all settings information included in the user information and displaying these settings names as a boot file on a display of said user terminal; and (d) a process which, when the user selects an OS environment desired to be booted from the boot menu displayed on said display, is for transmitting an operating system, start-up application, user ID and security information, which correspond to the OS environment selected from the user information by the user, to a server;

said server having a user database in which user information has been registered; when the user information has been received, said server retrieving the user information from said user database, comparing the user information that has been transmitted from said user terminal with information that has been registered in said user database; said server verifying whether the user possesses the privilege to implement a requested OS environment; and said server transmitting an operating system and application, which have been specified at said user terminal, to said user terminal if it has been verified that the user possesses said privilege;

said BIOS preboot means of said user terminal having:

(e) a process for storing the operating system and application, which have been transmitted from said server, as files in a secondary storage device of said user terminal; and (f) a process for delivering control to said operating system together with a boot option of said operating system, and booting said operating system.

4. A computer readable program product for executing processes (a) and (b) by a computer of a server, wherein when power is supplied to a user terminal, a system BIOS in a read-only storage device thereof is executed;

said system BIOS having means for loading BIOS preboot means, which has been stored in said storage device, in a memory of said user terminal after initialization processing, and delivering control to said BIOS preboot means;

said BIOS preboot means having:

means for acquiring OS booting user information, which has been stored on a removable storage medium, using a removable-storage device driver of said user terminal;

means for extracting settings names from all settings information included in the user information and displaying these settings names as a boot file on a display of said user terminal; and means which, when the user selects an OS environment desired to be booted from the boot menu displayed on said display, is for transmitting an operating system, start-up application, user ID and security information, which correspond to the OS environment selected from the user information by the user, to a server;

said server having a user database in which user information has been registered;

said server having:

(a) a process which, when the user information has been received, retrieves the user information from said user database, compares the user information that has been transmitted from said user terminal with information that has been registered in said user database, and verifies whether the user possesses the privilege to implement a requested OS environment; and (b) a process for transmitting an operating system and application, which have been specified at said user terminal, to said user terminal if it has been verified that the user possesses said privilege;

said BIOS preboot means of said user terminal having:

means for storing the operating system and application, which have been transmitted from said server, as files in a secondary storage device of said user terminal; and means for delivering control to said operating system together with a boot option of said operating system, and booting said operating system.

5. A user terminal network-connected to a server which stores an operating system executed by the user terminal, said user terminal downloading the operating system from said server and booting the operating system, said user terminal comprising:

preboot means started up at booting; and means for accessing a storage medium removably inserted into said user terminal;

said preboot means having:

means for transmitting, to said server, information corresponding to an operating system which a user has selected from OS-boot setting user information that has been recorded on said storage medium; and means which, when said server authenticates the user of said user terminal based upon the user information that has been transmitted from said user terminal and transmits a specified operating system and application to said user terminal, is for storing the operating system and application as files in a secondary storage device of said user terminal, delivering control to said operating system together with a boot option of the set operating system, and booting said operating system, wherein there is a server comprising:

a storage device for storing an operating system and an application started up by a user terminal;

a user database in which are previously registered, for every user ID, an operating system bootable by the user terminal, an application capable of being started by the user terminal, and security information;

means which, when the user information has been received by said user terminal is for retrieving the user information from said user database, comparing the user information that has been transmitted from said user terminal with information that has been registered in said user database, and verifying whether the user possesses the privilege to implement a requested OS environment; and means for transmitting an operating system and application, which have been specified at said user terminal, to said user terminal if it has been verified that the user possesses said privilege.

* * * * *

UNITED STATES PATENT AND TRADEMARK OFFICE
CERTIFICATE OF CORRECTION

PATENT NO.     : 6,928,541 B2  
DATED          : August 9, 2005  
INVENTOR(S)    : Sekiguchi It is certified that error appears in the above-identified patent and that said Letters Patent is hereby corrected as shown below:

Title page,
Item [76], please replace "[76]" with -- [75] --.

Signed and Sealed this

First Day of November, 2005

JON W. DUDAS
*Director of the United States Patent and Trademark Office*